Oct. 3, 1939.　　　　J. W. CRAIG　　　　2,175,077
SPEED INDICATOR FOR MOTOR VEHICLES
Filed Jan. 12, 1938
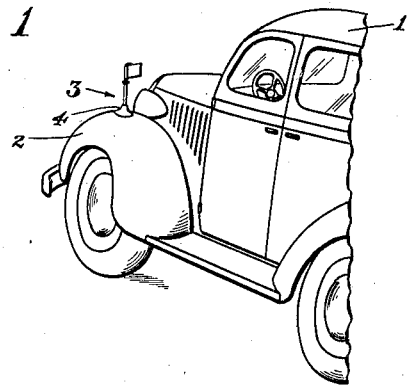
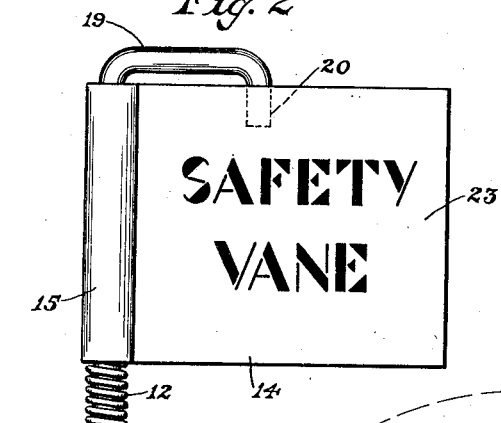
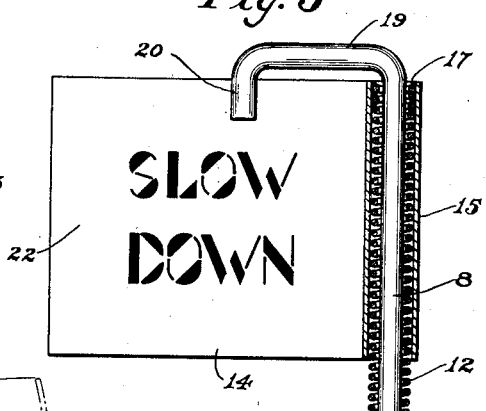
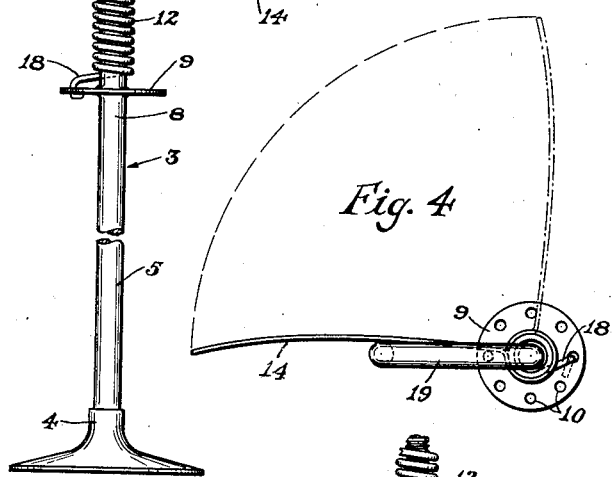
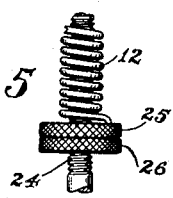
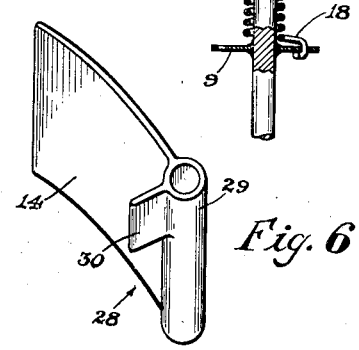
JAMES W. CRAIG
INVENTOR
BY Perley H. Plant
ATTORNEY Patented Oct. 3, 1939

2,175,077

UNITED STATES PATENT OFFICE 2,175,077

SPEED INDICATOR FOR MOTOR VEHICLES

James W. Craig, Providence, R. I.

Application January 12, 1938, Serial No. 184,517

5 Claims. (Cl. 116—57)

This invention relates to a visible speed signal for automobiles, aeroplanes and the like which is located outwardly of the body and in position to be operated by the wind pressure developed from the speed of the vehicle and in position to be seen by the driver and others to indicate the approximate speed, and so located as to be within the path of view of the driver as he watches the road.

One object of the invention is the provision of a device of this character which may be located substantially within the path of vision of the driver outwardly of the body from the driver so that the driver will be conscious of its position while observing the road and approaching traffic.

Another object of the invention is the provision of a device of this character so positioned upon an automobile that it may act as a guide or marker in driving to show the position of the side of the automobile with relation to other traffic.

A further object of the invention is the provision in a device of this character of means whereby a signal of this type may be set to register automatically a given rate of speed and capable of being changed as desired to indicate different speeds.

Other objects and advantages of the invention relate to various improved details of construction and novel arrangements of the parts as will be more fully set forth in the detailed description to follow.

Referring to the drawing:

Fig. 1 is a detail, perspective view of a portion of an automobile showing the position of the parts when the speed signal is located upon the automobile fender and on that side which is nearest to the driver, Fig. 2 is an elevational view of one form of the speed signal such as may be applied to the fender or attached to the end portion of the front bumper of an automobile, showing the parts in their initial positions uninfluenced by wind pressure, Fig. 3 is a side elevational view, taken from the side opposite to that shown in Fig. 2, and partially in section, illustrating the manner of mounting the vane on the standard, Fig. 4 is a top plan view of the structure showing the slightly curved shape of the vane and the form of the shoulder as well as the location and arrangement of the means for anchoring the spring in different tensioned positions, Fig. 5 is a detail side elevational view of a portion of the standard provided with a modified form of shoulder which is adjustable on the standard, and, Fig. 6 is a perspective view of a somewhat modified form of vane provided with a booster vane for assisting in securing movement of the main vane into full indicating position.

In the embodiment of the invention illustrated herewith, 1 designates generally an automobile which is provided with a fender 2 upon which is mounted the speed signal device 3, which may comprise a base 4 having a standard 5 extending upwardly therefrom.

The upper end 8 of the standard 5 supporting the signal proper may be reduced in size relative to the lower portion thereof and has a shoulder 9 secured thereto or formed integral therewith which may be of circular form and provided with a plurality of circumferentially spaced openings 10 adapted to receive and provide anchoring means for one end of a coiled spring 12 surrounding the upper end portion of the standard.

A vane 14 has a rounded hollow edge portion 15, which may be made by bending the thin metal of which the vane is formed into a tubular shape, and which surrounds a portion of the reduced upper end of the standard so as to be capable of rotating substantially freely about the standard.

The coiled spring 12 surrounds the upper portion 8 of the standard and the upper end of the coil may project within the cylindrical portion 15 of the vane 14 and be secured thereto in any suitable or desired manner, as by means of solder, as indicated at 17. The lower end portion of the coiled spring 12 may be offset outwardly from the path of the coil and provided with an end 18 shaped to engage and be anchored within one of the openings 10 formed in the shoulder 9.

The extreme upper end portion of the standard above the vane 14 is bent over at substantially right angles to the standard 8, as indicated at 19, and has a downturned tip 20 spaced somewhat from the upper end portion of the standard and adapted to be engaged by the vane 14 and prevent free rotation of the vane 14 beyond that point under the tension exerted by the coiled spring 12. The downturned tip 20 may be located in laterally offset relation with one side of the standard when the device is in operative position upon an automobile, and the tension of the coiled spring 12 holds the vane normally in contact with the tip 20 when the automobile is not in motion. When the vehicle is in motion wind pressure developed by the motion of the vehicle acts upon that side of the vane engaging the tip 20, which side is indicated at 22, and forces the vane about the standard until at the speed for which the coiled spring is set to register the vane points substantially directly rearwardly, and the side 22 is then within the view of the driver. The side 22 of the vane may be painted a distinguishing color, such as red, and may carry indicia, such as, "Slow down". The side 23 of the vane 14, opposite to the side 22, may be painted a distinguishing color, such as green, and may carry indicia thereon, such as, "Safety vane".

The vane 14 may be curved somewhat throughout a part or the whole of its extent outwardly from the portion 8 of the standard, as is indicated in Fig. 4 of the drawing, to give the side 22 a slight concavity whereby it is more positively influenced by the wind pressure throughout its movement about the standard and into its indicating position.

As a somewhat modified means for adjusting the tension of the spring 12 to set the device for operation at the speed desired, the upper portion 8 of the standard may be threaded, as indicated at 24, and a shoulder piece 25 threaded thereon and provided with means for anchoring the offset end 18 of the spring 12. In this case a lock nut 26 may be provided for locking the adjustable shoulder piece 25 in the desired adjusted position.

In Fig. 6 of the drawing, there is shown a somewhat modified form of vane structure in which the vane proper is indicated at 28, and which may be made after the manner above described or may be in the form of a casting of a suitable light weight metal, such as aluminum. In this form of the structure a cast hollow cylindrical portion 29 is provided for receiving the upper end portion 8 of the standard and the coiled spring 12, and there is provided also a booster vane portion 30 located at a suitable angle to the main portion of the vane 14 for increasing the throw of the main portion of the vane 14 as it approaches its indicating position under the influence of wind pressure. It will be seen that in this form of the structure the booster vane portion 30 may be located at or nearly at right angles to the main portion of the vane 14, so that as the vane 14 approaches its indicating position the booster vane will be subject to the full force of the wind pressure to insure movement of the main portion of the vane into full indicating position.

This form of signal device lends itself to use for mounting in a vertical position at or adjacent to the end of the bumper of an automobile, or on the fender adjacent to the front end of the automobile, or on the door or door frame so that it is located opposite to the front window. The latter position may be regarded as particularly applicable for use in connection with trucks and the like in which the body frame of the cab is especially adapted to provide an anchorage for a device of this character placed in such a manner that the vane is viewable either through the windshield or through the side window.

The spring 12 may extend any desired distance within the tubular portion 15 or the cylindrical portion 29 and may be secured thereto in any suitable or desired manner, as by means of solder, as indicated at 17. By extending the spring 12 a considerable distance within the portion 15 or the portion 29 and securing the parts together only at a point adjacent to the uper end of the spring a considerable portion of the spring is rendered available for exerting its resilient force upon the vane and the spring becomes less effective for moving the vane into position against the stop 20. This provides a more sensitive action of the vane and may call for a wider range of adjustment for the end 18 of the coiled spring. By reducing the length of the coiled spring so far as its effectiveness is concerned the reverse of the above condition may be brought about, requiring less movement of the end 18 of the coiled spring to adjust the vane for operation at different speeds.

In any case, the coiled spring 12 tends to maintain the vane 14 in contact with the tip 20 of the standard until wind pressure developed by the speed of the vehicle moves the vane rearwardly away from the tip 20 and into indicating position as shown in dotted lines in Fig. 4 of the drawing. The tip 20 acts as a stop to prevent rotation of the vane about the standard in one direction beyond the point desired, and maintains it substantially in position to be acted upon by wind pressure and thus moved into indicating position.

The booster vane element 30, from its position adjacent to the pivot point of the main vane 14 exerts its greatest influence on the main vane as the indicating position is approached, and the extent of the booster element may be varied as desired relative to that of the main vane or its angular position modified to increase or decrease its effectiveness as may be found desirable.

What I claim is:

1. A speed indicator for motor vehicles comprising a base adapted for attachment to a portion of a motor vehicle, a standard, an indicating vane having a sleeve encircling a portion of the standard, said vane being movable about the standard under the influence of wind pressure exerted upon one side of the vane, and spring means surrounding the standard within the sleeve and having opposite end portions secured to the standard and sleeve respectively constantly effective for resisting the wind pressure exerted on the vane.

2. A speed indicator for motor vehicles comprising a part adapted for attachment to a portion of a motor vehicle, a standard, a spring coiled about the standard, an indicating vane having a sleeve portion encircling the spring and standard and resiliently connected with the standard through said coiled spring for movement about the standard under the influence of wind pressure due to the speed of the vehicle and exerted upon one side of the vane, and a stop carried by the standard and engageable with a portion of the vane for limiting its movement about the standard in one direction beyond a point where the wind pressure will be effective for moving the vane into signalling position.

3. A speed indicator for motor vehicles comprising a part adapted for attachment to a portion of a motor vehicle, a standard, an indicating vane having a sleeve portion surrounding the standard and movable about the standard under the influence of wind pressure due to the speed of the vehicle, spring means having a portion located between the sleeve and standard resiliently supporting the vane relative to the standard and acting upon the vane against the force exerted by the wind pressure, and means for adjusting said spring means to increase or decrease its pressure on the vane against the force exerted by the wind.

4. A speed indicator for motor vehicles comprising a part adapted for attachment to a portion of a motor vehicle, a standard, a multi-vane unit comprising an indicating vane having a smaller angular booster vane element secured to its leading edge carried by the standard and movable about the standard under the influence of wind pressure due to the velocity of the vehicle exerted on the sides of the indicating vane and its booster vane element, a spring member acting upon the multi-vane unit to resist movement of the same under the pressure exerted by the wind, and means for setting the spring member to indicate any one of different vehicle velocities when the multi-vane unit is forced into a given position with relation to the standard.

5. A speed indicator for motor vehicles comprising a part adapted for attachment to a portion of a motor vehicle, a standard, a curved indicating vane carried by the standard and movable about the standard under the influence of wind pressure due to the speed of the vehicle, a booster vane, carried by the indicating vane and angularly positioned relative thereto for increasing the throw of said main vane about the standard and into full indicating position, a spring member acting upon the vane to resist movement of the same under the pressure exerted by the wind, and means for setting the spring member to indicate any one of different vehicle speeds when the vane is forced into a given position relative to the standard.

JAMES W. CRAIG.